United States Patent [19]

Just

[11] Patent Number: 4,875,784

[45] Date of Patent: Oct. 24, 1989

[54] DIVIDED SLIDE BEARING

[75] Inventor: Karl Just, Friedrichshafen, Fed. Rep. of Germany

[73] Assignee: MTU Motoren- und Turbinen-Union Friedrichshafen GmbH, Friedrichshafen, Fed. Rep. of Germany

[21] Appl. No.: 302,304

[22] Filed: Jan. 26, 1989

[30] Foreign Application Priority Data

Jan. 27, 1988 [DE] Fed. Rep. of Germany ....... 3802275

[51] Int. Cl.$^4$ ............................................. F16C 17/02
[52] U.S. Cl. ..................................... 384/273; 384/295
[58] Field of Search ................ 384/273, 272, 294, 295, 384/434, 432

[56] References Cited

U.S. PATENT DOCUMENTS

| 1,477,622 | 12/1923 | Aab | 384/273 |
| 4,426,162 | 1/1984 | Tsuchiya et al. | 384/295 |
| 4,540,294 | 9/1985 | Lamperski et al. | 384/273 |
| 4,770,546 | 9/1988 | Pentz et al. | 384/273 |

FOREIGN PATENT DOCUMENTS 2711938 12/1984 Fed. Rep. of Germany .

Primary Examiner—Lenard A. Footland
Attorney, Agent, or Firm—Barnes & Thornburg

[57] ABSTRACT

The invention relates to a slide bearing with two bearing shell halves which are held together during the installation by springy clamps. The clamps are formed from a band-shaped material piece having two bow-shaped legs bent over toward a side which are supported in inwardly inclined end areas at edges of the bearing shell halves. The seating of the clamp is thereby wobble-free, and more particularly both when the clamp is inserted with only one end into a mounting as also when both bearing shell halves are assembled which then are held together without play. The secure seating of the clamps is attained by multiple linearly- and areally-like supports of the clamps and by springy abutment at the inwardly bent end areas of the legs of the clamp, whereby axially acting forces result. In addition to the assembly, also the disassembly is very simple because the clamps are constructed so as to be adapted to be overcome by pressure in two directions, and therefore the springy ends of the clamps need not be pressed down. The bearing shell halves merely have to be pulled apart which can take place with a commercially customary tool.

2 Claims, 2 Drawing Sheets 25.01.88

87176

DIVIDED SLIDE BEARING

BACKGROUND AND SUMMARY OF THE INVENTION invention relates to a split slide or friction bearing of the type disclosed, for example, in the DE-PS No. 27 11 938.

A slide bearing is illustrated in the aforementioned patent whose two bearing shell halves are held together during the installation by clamps. The clamps made from a springy roundor band-material engage in bores with circular cross section which start from the separating surfaces of the bearing shell halves. In one embodiment, the clamp is constructed with cranked portions apparently adapted to be overcome in two directions by pressure which are illustrated in the patent as engaged in recesses of the mounting bores formed by cross bores. However, in order to achieve the holding-together of the bearing shell halves, however, it is initially necessary to fix the clamp in one mounting bore in a position in order that its other end can find its way into the mounting bore of the oppositely disposed bearing shell half. A clamp inserted with one end, however, experiences no retention in the mounting bore by reason of its shape with two obliquely protruding legs and again falls out in the unfavorable case or assumes an undefined Position in which the projecting end cannot find its way automatically into the other mounting bore without special holding means. An assembly method in which special devices for holding the clamp are required and which additionally have to be arranged between the separating surfaces to be moved together, is of no use in practice. For the disengagement of the connection, the cranked portions are to be pressed out of the cross bores. As already described, the clamp would fall out of the mounting bore after pulling the bearing shell halves apart by reason of the lacking retention. Insofar as the slide or friction bearing involves, for example, a connecting rod bearing of ah internal combustion engine, the clamp would then get into the crank space from where it could be removed again only with great expenditure.

In a further embodiment, a clamp includes two legs bent to a side, of which one leg is spread apart barb-like and the other is bent eyelet shaped. As the retention of the bearing shell half connected with the eyelet-shaped end of the clamp is effected exclusively by force-locking engagement, and as the retaining forces are therefore limited, this may lead easily to undesirable dislocations or displacements of the bearing shell halves. At least with heavy bearing shells, the use of this clamp is not advisable.

In a further embodiment also illustrated in the DE-PS No. 27 11 938, the clamp includes legs spread apart barb-like at both ends which engage in recesses or cross bores of the mounting bores. It is disadvantageous with this type of construction of the clamp that by reason of the necessary manufacturing tolerances, a clearance-free holding together of the bearing shell halves is not assured. However, if the bearing shell halves gape apart, then the installation is rendered difficult. It is furthermore disadvantageous that the clamps which remain at the bearing shell halves after the termination of the bearing installation, can carry out movements of their own by reason of the manufacturing tolerances. It is also disadvantageous that the once-established connection can be disengaged only in that a tool engages in a cross bore, by means of which a barb is bent back whereas at the same time the bearing halves have to be pulled apart.

According to an internal state of the art of the assignee of the present invention, the hollow spaces, into which the clamps are i stalled which are made of a band material and have barb-like legs, are constructed as groove-shape milled-out parts. The advantage is achieved thereby that the clamps will find their way into their mountings far-reachingly positionally correct and the barb-like legs therefore engage reliably in the provided cross-grooves. However, as the legs are unstressed after the engagement in the cross bores, no fixed seating of the clamps is achieved As the clamps may therefore tilt, the guiding together of the bearing shell halves is eventually rendered difficult by canting. After the bearing shell halves are placed against one another, the bearing shell halves then gape apart which is unfavorable for the further installation of the bearing. After completed installation, a wobble-free seating of the clamps remaining in their mountings can be achieved only in that shoulders at the clamps are enlarged so that the clamps are fitted play-free into a bearing half. However, an eventual subsequent disassembly is again rendered difficult thereby.

The present invention is concerned with the task to provide a clamp which automatically assumes a secure seating in its mounting, and more particularly both when it is inserted only unilaterally in one mounting as also when the bearing shell halves are placed one against the other so that, on the one hand, a secure automatic location of the clamp in the open mounting at the other bearing shell half and therewith a simple problem-free assembly and also a simple subsequent disassembly is assured and, on the other hand, the bearing shell halves are retained pressed one against the other without play.

The underlying problems are solved according to the present invention in that the hollow spaces starting from the separating surfaces, as also the holes extending transversely thereto are constructed as groove-shaped milled-out parts, and the clamps are constructed of a single material-piece with two bow-shaped legs each, bent to one side toward one another and having inwardly inclined sections in the end areas, in that the clamps are supported on their bottom side in the hollow spaces, and with the bearing shell halves placed against one another abut supported springily in both end areas at the straight mutually oppositely disposed edges of the through-passage area, and in that the clamps with a unilateral seating in a bearing shell half abut axially pressed against the hollow space walls within the area of the bend of the legs. The fixed seating of the clamps in their mountings, even before the bearing shell halves are placed one against the other, is achieved in that the hollow spaces for the mounting of the clamps are constructed as groove-shaped milled-out parts having an essentially rectangular cross section, and the clamps made of a band material are supported at their end, initially inserted unilaterally into the mounting, at three places either linearly or areally. For, by reason of the springy abutment of one leg in its inwardly bent end area, an axial force results which presses the clamp axially within the area of its bend against the walls of the hollow space. At its bottom side, the clamp is also pressed areally against its support by reason of the spring action of the leg. With bearing shell halves placed against one another, the legs abut under spring prestress at respectively corresponding edges of the bearing shell halves, as a result of which they are pressed against one another without play in their separating surfaces. It is also assured therewith that the clamps after completed bearing installation cannot carry out any undesired movements of their own. The disassembly is simple because the legs of the clamps have to be pressed down exclusively by an axially pulling apart action. It is automatically assured that the clamps are thereby retained in every case unilaterally in a mounting combined with a secure seating.

BRIEF DESCRIPTION OF THE DRAWINGS

These and other objects, features and advantages of the present invention will become more apparent from the following description when taken in connection with the accompanying drawing which shows, for purposes of illustration only, one embodiment in accordance with the present invention, and wherein.

DETAILED DESCRIPTION OF THE DRAWINGS

Figure 1:
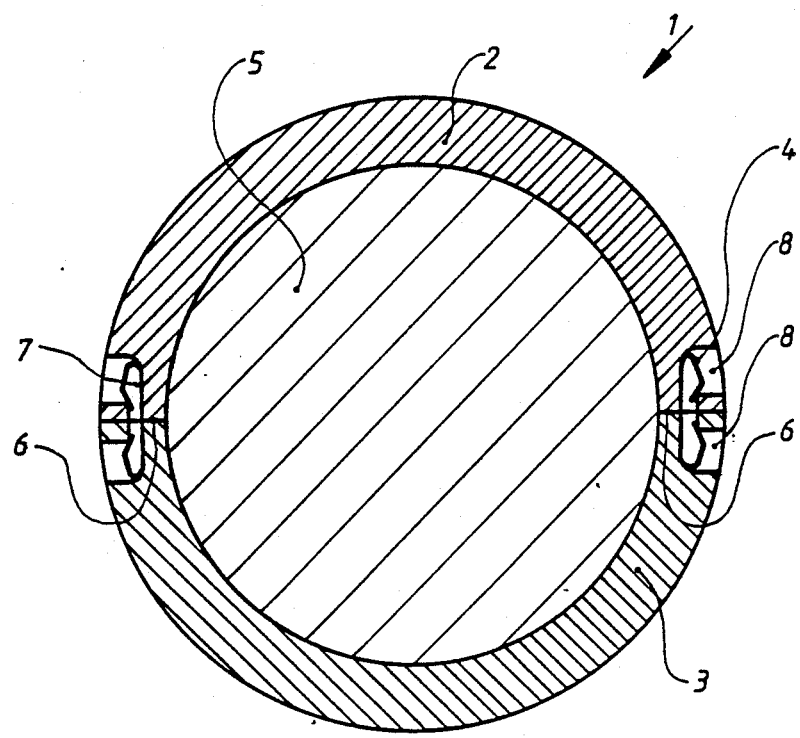
FIG. 1 is a transverse cross-sectional view through two bearing shell halves of a slide bearing held together by two clamps in accordance with the present invention.

Referring now to the drawing wherein like reference numerals are used throughout the two views to designate like parts, the slide or friction bearing generally designated by reference numeral 1 which is illustrated in FIG. 1, consists of two bearing shell halves 2 and 3 which during the installation are held together at two circumferential places by clamps 4. After the installation of the bearing, the clamps 4 are without function but remain in place. Such slide bearings 1 are utilized, for example, in connection with connecting rod bearings in internal combustion engines whereby the bearing shell halves 2 and 3 are arranged on the journal 5 of the crankshaft.

Figure 4:
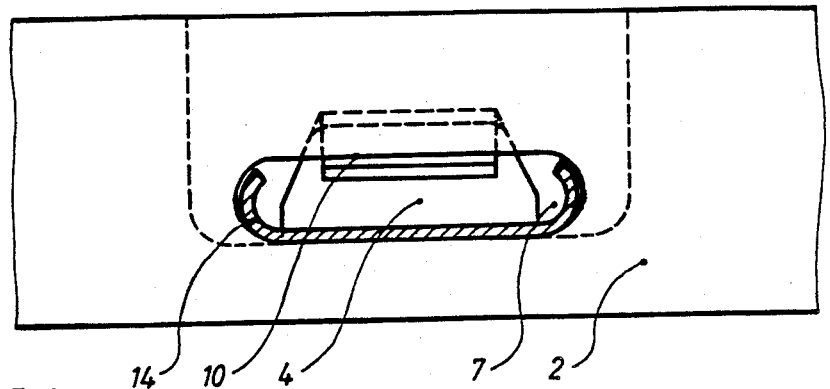
FIG. 4 is an elevational view on the separating surface of a bearing shell half within the area of the clamp taken in the direction of the cross-sectional line IV—IV shown in FIG. 2.
Figure 2:
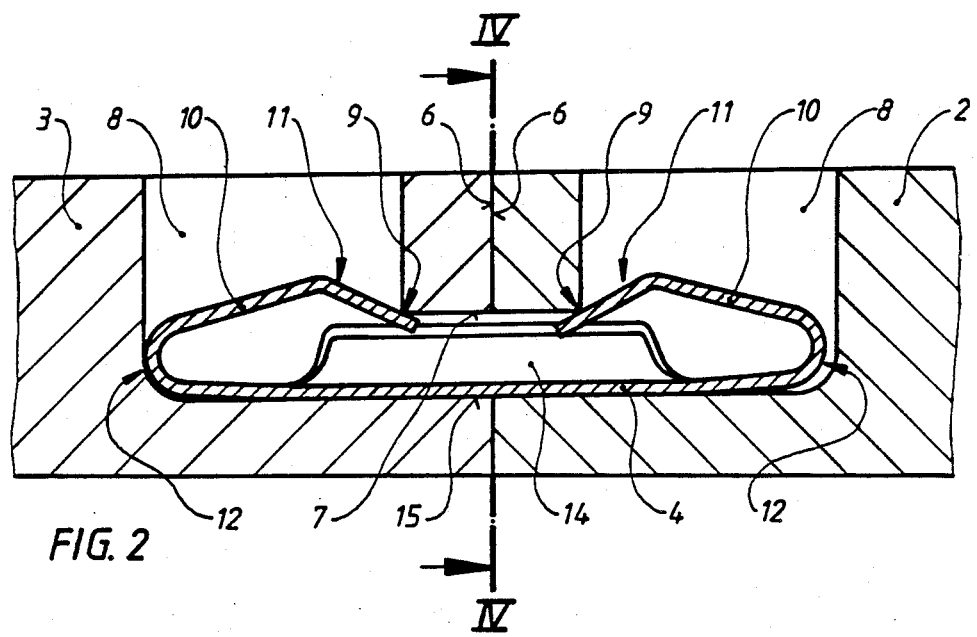
FIG. 2 is a longitudinal cross-sectional view through a clamp taken along line II—II of FIG. 3, and illustrating its position in the assembled bearing shell halves.
Figure 3:
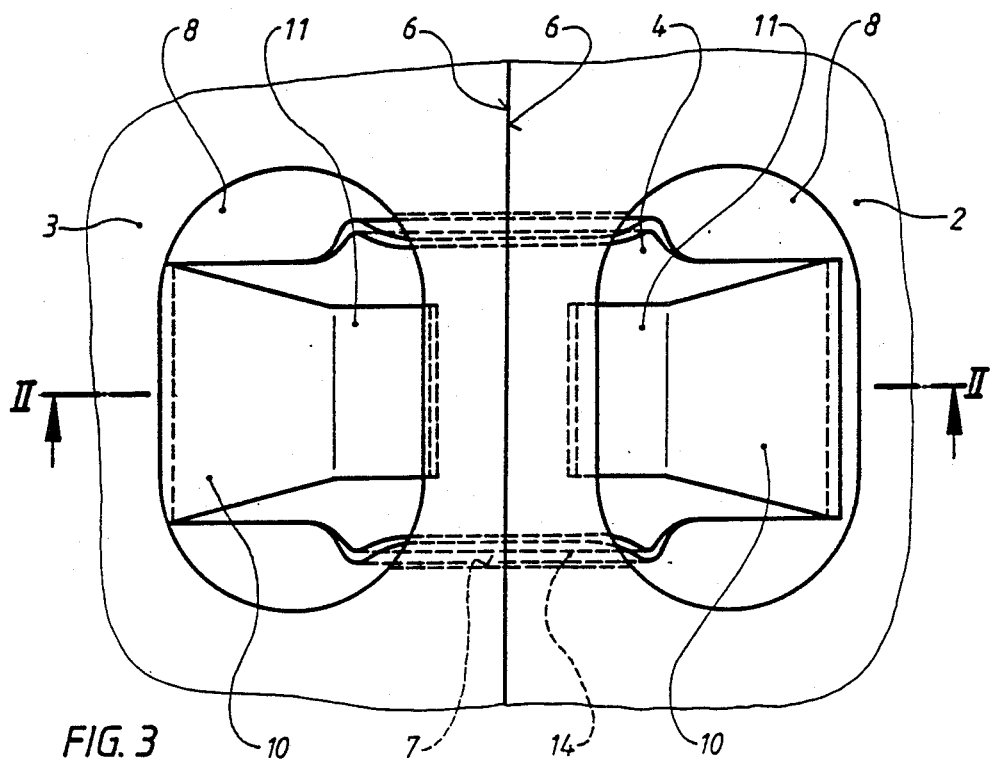
FIG. 3 is a plan view on the bearing shell halves within the area of the clamp connection.

FIGS. 2 to 4 illustrate a clamp 4 in its seat extending over the separating surfaces 6 of two bearing shell halves 2 and 3 within hollow spaces 7 starting from the separating surfaces 6, which are constructed as groove-shaped milled-out parts. The cross-sectional view of a hollow space 7 serving as mounting is illustrated in FIG. 4 which is an elevational view on a separating surface 6 in the direction of the cross-sectional line shown in FIG. 2. Holes 8 extend transversely to the hollow spaces 7 starting from the separating surfaces 6 which holes are also constructed as groove-shaped milled-out parts. Their constriction is illustrated in FIG. 3 which represents a plan view on the bearing shell halves 2 and 3 within the area of the clamp 4, and in FIG. 2 which represents a longitudinal cross section along the cross-sectional line II—II of FIG. 3. Owing to the intersection of the holes 8 and of the hollow spaces 7, straight edges 9 result at the remaining webs which serve as abutment for the legs 10 of the clamps 4.

The clamps 4 are made from a band-shaped material part with two legs 10 bent-over toward a side which are constructed essentially bow-shaped with oblique surfaces mutually inclined roof-shaped. In particular, the legs 10 are inwardly inclined in their end areas 11 and abut within these areas linearly at the straight edges 9 of the intersection area. The legs 10, however, may also be curved convexly. However, the curvature must not be too flat so that a sufficient form-locking engagement with the edges 9 exists. As the legs 10 are under spring prestress, the bearing shell halves 2 and 3 are pressed against one another at their separating surfaces 6 without play as a result of axially acting forces.

No special tool is required for the installation of the clamps 4 by reason of their construction. After the insertion of clamps 4 into the hollow spaces 7, for example, in the upper bearing shell half 2, the lower bearing shell half 3 is placed against the bearing shell half 2 lying on the journal 5. As the clamps are already in a secure and wobble-free seating prior to the pressing-together of the bearing shell halves 2 and 3, the clamps 4 find their way with their other end securely and free of canting into the hollow spaces 7 of the respectively other bearing shell half. The secure seating of the clamp 4 is achieved in that the clamp 4, as long as the bearing shell halves 2 and 3 are not yet joined together, abut linearly shaped, respectively, areally shaped in their mounting in at least three places. By reason of their springy abutment at the edge 9 with their inwardly inclined end area 11, an axial force results which presses the clamp 4 within its bend 12 against the bottom of the hollow space walls. At the same time, it also abuts areally with its bottom side 15 on its support. In the left half of the FIGS. 2 and 3, the clamp 4 is thereby shown in the position in which it finds itself before the emplacement of the bearing shell half 2, namely, axially abutting with the bend 12 at the hollow space wall. The lateral guidance of the clamp 4 takes place by bent-up lugs 14. By reason of this support, the clamp 4 is fixed in a definite position. By moving the lower bearing shell half into position, the clamp 4 also comes into abutment at the corresponding edges 9 at its other end by means of the inclinedly extending area 11. By reason of the inward inclination of the two end areas 11, axial forces result which pull together the two bearing shell halves 2 and 3. As the bearing shell halves are already now in the position in which they also find themselves after completed bearing installation, and as the clamps 4 already now assume a secure seating, it is assured that the clamps 4 also cannot move freely after a completed installation of the bearing. By reason of the axial forces acting mutually oppositely at the two legs, the clamp is pulled into a symmetrical center position after the emplacement of the other bearing shell half in which it no longer abuts at the axial wall boundaries. A corresponding position is illustrated in the right half of the FIGS. 2 and 3.

As the legs 10 of the clamp 4 are adapted to be overcome by pressure in two directions, the disassembly of the bearing can take place in a simple manner, namely, by simply pulling apart the bearing shell halves 2 and 3. A commercially customary Seegerring plier is used for that purpose which engages into the holes 8 starting from the bearing shell halves and pulls the bearing shell halves apart. It is in particular of advantage that the springy ends of the clamps 4 need not be pressed down. Additionally, it is assured that the clamps remain connected in each case with one bearing shell half. For by reason of non-uniformities conditioned by manufacture, also the spring prestress in the legs is somewhat different so that both clamp ends are never pulled out of their mounting at the same time. It can also be determined by a different spring prestress of the two legs in which bearing shell half the clamps 4 are to remain.

In some applications, more particularly when the bearing shell halves, as this is the case, for example, in crankshaft bearings of internal combustion engines, are to be fixed during the installation exclusively in the axial direction, the illustrated clamp may also find application. It then engages on one side as described in a bearing shell half whereas an open groove for the engagement of the clamp suffices in the other bearing shell half. The canting-free attachment is assured by its secure seating. Of course, the end engaging into the open groove can also be constructed more simple because only an axial support takes place thereat.

While I have shown and described only one embodiment in accordance with the present invention, it is understood that the same is not limited thereto but is susceptible of numerous changes and modifications as known to those stilled in the art, and I therefore do not wish to be limited to the details shown and described herein but intend to cover all such changes and modifications as are encompassed by the scope of the appended claims.

I claim:

1. A split slide bearing, comprising two bearing shell halves held together during the installation by clamp means made from a springy flat material, the bearing shell halves being provided with separating surfaces abutting at one another and with hollow spaces starting from the separating surfaces which extend-substantially perpendicularly to the separating surfaces, the clamp means which extend over the separating surfaces and are springily supported in the hollow spaces being arranged in said hollow spaces, the clamp means coming into form-locking abutment with edges within clamp areas adapted to be overcome by pressure in two directions, the edges resulting from the intersection of holes extending substantially transversely to the direction of the hollow pieces, the hollow spaces as also the holes extending transversely thereto being constructed as groove-shaped filled-out parts and the clamp means made from a unitary material part including each two bow-shaped legs bent to a side toward one another, said legs having inwardly inclined sections in the end areas, the clamp means being supported on their bottom side in the hollow spaces, and with the bearing shell halves placed one against the other abutting springly supported in both end areas at the straight edges of the intersection area which are disposed facing the same, and the clamp means with a unilateral seating in one bearing shell half abutting axially pressed against the hollow space wall within the area of the bend of the legs.

2. An arrangement according to claim 1, wherein the bow-shaped leg of the clamp means includes oblique, roof-like mutually inclined surfaces.

* * * * *